United States Patent
Yamamoto et al.

[11] 3,890,323
[45] June 17, 1975

[54] PHENYLKETONE DERIVATIVES

[75] Inventors: Hisao Yamamoto, Nishinomiya; Shigeho Inaba, Takarazuka; Kikuo Sasajima, Toyonaka; Masaru Nakao, Osaka; Isamu Maruyama, Minoo; Keiichi Ono, Osaka; Shigenari Katayama, Takarazuka, all of Japan

[73] Assignee: Sumitomo Chemical Co., Ltd., Japan

[22] Filed: June 13, 1973

[21] Appl. No.: 369,461

[30] Foreign Application Priority Data
June 14, 1972 Japan.........................47-59895

[52] U.S. Cl.... 260/268 R; 260/268 PH; 260/288 R; 260/293.6; 260/293.66; 260/293.78; 260/295 K; 260/999
[51] Int. Cl............................................. C07d 51/70
[58] Field of Search...... 260/268 R, 268 PH, 288 R, 260/293.6, 293.66, 293.78, 295 K

[56] References Cited
UNITED STATES PATENTS
3,161,645  12/1964  Janssen........................... 260/293.4
3,629,267  12/1971  Kaiser et al.................. 260/294.8 C
3,799,932  3/1974  Yamamoto et al............. 260/293.6

OTHER PUBLICATIONS
Morrison et al., "Organic Chemistry, 2nd Ed.," Allyn and Bacon, Boston (1966), pp. 640–641.

Primary Examiner—G. Thomas Todd
Attorney, Agent, or Firm—Craig & Antonelli

[57] ABSTRACT

Phenylketone derivatives of the formula:

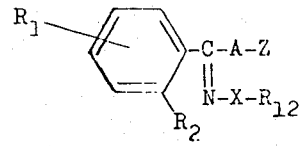

which can be prepared by reacting a ketone of the formula:

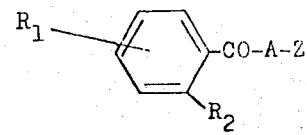

with a compound of the formula:

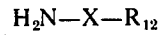

and are useful as medicaments such as neuroleptics, tranquilizers, anticonvulsives, analgesics, antiinflammatory agents and antihypertensives.

7 Claims, No Drawings

PHENYLKETONE DERIVATIVES

The present invention relates to novel phenylketone derivatives and their production. More particularly, it relates to phenylketone derivatives of the formula:

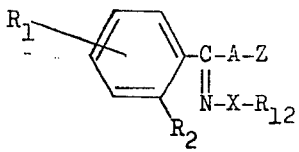   [I]

wherein $R_1$ is a hydrogen atom, a halogen atom, a lower alkyl group, a lower alkoxy group, an amino group, a lower alkylamino group, a di(lower)alkylamino group, a benzylamino group or a trifluoromethyl group, $R_2$ is a hydrogen atom, a halogen atom, an amino group, an acylamino group, a lower alkylacylamino group, a lower alkylamino group, a di(lower)alkylamino group or a nitro group, $R_{12}$ is a hydrogen atom, a lower alkyl group, a carbamoyl group or an optionally substituted phenyl group, A is a lower alkylene group, X is an oxygen atom or

(wherein $R_{13}$ is a hydrogen atom, a lower alkyl group or an optionally substituted phenyl group) and Z is a group of either one of the formulas:

(wherein $R_3$ is a hydrogen atom or a hydroxyl group and $R_4$ is a hydrogen atom, a phenyl group or a benzyl group, the phenyl group and the benzyl group having optionally one or two substituents selected from the group consisting of halogen, lower alkyl, lower alkoxy and trifluoromethyl on the benzene ring),

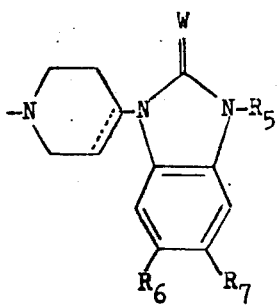

(wherein W is two hydrogen atoms or an oxygen atom, $R_5$ is a hydrogen atom or a lower alkyl group, $R_6$ and $R_7$ are each a hydrogen atom, a halogen atom or a lower alkyl group and the dotted line is an optional bond between the carbon atoms at the 3- and 4-positions of the piperidine ring),

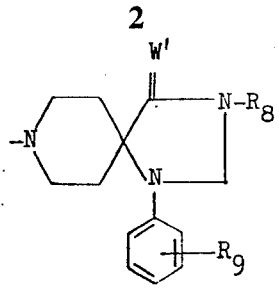

(wherein W' is two hydrogen atoms or an oxygen atom, $R_8$ is a hydrogen atom or a lower alkyl group and $R_9$ is a hydrogen atom, a halogen atom, a lower alkyl group or a lower alkoxy group),

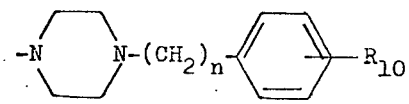

(wherein $R_{10}$ is a hydrogen atom, a halogen atom, a lower alkyl group, a lower alkoxy group or a trifluoromethyl group and n is an integer of from 0 to 2), and

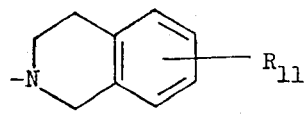

(wherein $R_{11}$ is a hydrogen atom, a halogen atom, a hydroxyl group, a lower alkyl group, a lower alkoxy group or a nitro group), and their salts, and production thereof.

In the significances as defined above, lower alkyl includes $C_1$–$C_4$ alkyls such as methyl, ethyl, n-propyl, isopropyl, n-butyl, sec.-butyl and t-butyl; lower alkoxy includes $C_1$–$C_4$ alkoxys such as methoxy, ethoxy, n-propoxy, isopropoxy, n-butoxy, sec.-butoxy and t-butoxy; halogen includes fluorine, chlorine, bromine and iodine; acyl includes $C_1$–$C_5$ alkanoyls such as acetyl, propionyl, butyryl and valeryl, and benzoyls optionally substituted with one or two substituents selected from the group consisting of hydrogen, halogen, hydroxyl, lower alkyl, lower alkoxy, nitro and trifluoromethyl; optionally substituted phenyl includes phenyl, halophenyl, tolyl and methoxyphenyl; and lower alkylene includes methylene, ethylene, trimethylene, propylene, tetramethylene, methyltrimethylene and butylene.

The phenylketone derivatives [I] have excellent pharmacological activities, in particular, central nervous system depressing action, antiadrenagic action and activity on autonomic nervous system and are useful as medicines such as neuroleptics, tranquilizers, anticonvulsants, analgesics, antiinflammatory agents, antihypertensives and the like.

Accordingly, a basic object of the present invention is to provide novel phenylketone derivatives [I]. Another object of this invention is to provide pharmaceutically useful phenylketone derivatives [I]. A further object of the invention is to provide an advantageous process for producing the phenylketone derivatives [I]. These and other objects will be apparent to those skilled in the art to whcih the present invention pertains from the foregoing and subsequent descriptions.

According to the present invention, the phenylketone derivative [I] can be prepared by reacting a ketone of the formula:

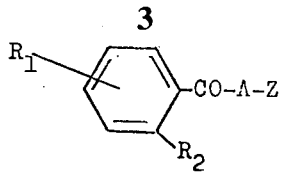

wherein $R_1$, $R_2$, A and Z are each as defined above with a compound of the formula:

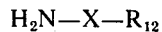

wherein $R_{12}$ and X are each as defined above.

As the compound [III], there may be exemplified hydrazine, phenylhydrazine, substituted phenylhydrazine, 1,1-diphenylhydrazine, alkylhydrazine, dialkylhydrazine, hydroxylamine, semicarbazide, etc. These compounds may be used in the form of a free base, hydrate or salt.

The reaction is usually carried out in an inert solvent such as an aromatic hydrocarbon (e.g. benzene, toluene, xylene), an organic acid (e.g. acetic acid), an amide (e.g. dimethylformamide, dimethylacetamide), a sulfoxide (e.g. dimethylsulfoxide), an alcohol (e.g. methanol, ethanol, propanol, butanol), an ether (e.g. dioxane, tetrahydrofuran, diethyl ether) or the like. In the reaction system, the presence of an acidic substance such as a mineral acid (e.g. hydrochloric acid, sulfuric acid, phosphoric acid), an organic acid (e.g. acetic acid) or a Lewis acid (e.g. zinc chloride, stannous chloride) or a basic substance such as an alkali carbonate (e.g. sodium carbonate, potassium carbonate), an alkali hydrogencarbonate (e.g. sodium hydrogencarbonate, potassium hydrogencarbonate), an alkali hydroxide (e.g. sodium hydroxide, potassium hydroxide) or an organic amine (e.g. pyridine, triethylamine) as a catalyst is generally preferred. Even if these catalysts are not used, the reaction can proceed at room temperature or under heating.

As the result of the above reaction, there is produced the phenylketone derivative [I], of which examples are the hydrazone, methylhydrazone, N,N-dimethylhydrazone, phenylhydrazone, halophenylhydrazone, alkylphenylhydrazone, akloxyphenylhydrazone, nitrophenylhydrazone, trifluoromethylphenylhydrazone, N,N-diphenylhydrazone, oxime, o-methyloxime and semicarbazone of the following ketones:

1-[γ-(4-Fluorobenzoyl)propyl]-4-(4-chlorophenyl)-4-hydroxypiperidine;

1-[γ-(2,4-Difluorobenzoyl)propyl]-4-(4-chlorophenyl)-4-hydroxypiperidine;

1-[γ-(2-Dimethylamino-4-fluorobenzoyl)propyl]-4-(4-chlorophenyl)4-hydroxypiperidine;

1-[γ-(2-Ethylamino-4-fluorobenzoyl)propyl]-4-(4-chlorophenyl)-4-hydroxypiperidine;

1-[γ-(2-Amino-4-fluorobenzoyl)propyl]-4-(4-chlorophenyl)-4-hydroxypiperidine;

1-[γ-(2-Acetamino-4-fluorobenzoyl)propyl]-4-(4-chlorophenyl)-4-hydroxypiperidine;

1-[γ-(2-Nitro-4-fluorobenzoyl)propyl]-4-hydroxy-4-(3-trifluoromethylphenyl)piperidine;

1-[γ-(4-Fluorobenzoyl)propyl]-4-hydroxy-4-(3-trifluoromethylphenyl)piperidine;

1-[γ-(2-Chloro-4-fluorobenzoyl)propyl]-4-hydroxy-4-(3-trifluoromethylphenyl)piperidine;

1-[γ-(2,4-Difluorobenzoyl)propyl]-4-hydroxy-43-trifluoromethylphenyl)piperidine;

1-[γ-(2-Dimethylamino-4-fluorobenzoyl)propyl]-4-hydroxy-4-(3-trifluoromethylphenyl)piperidine;

1-[γ-(2-Ethylamino-4-fluorobenzoyl)propyl]-4-hydroxy-4-(3-trifluoromethylphenyl)piperidine;

1-[γ-(2-Amino-4-fluorobenzoyl)propyl]-4-hydroxy-4-(3-trifluoromethylphenyl)piperidine;

1-[γ-(2-Acetamino-4-fluorobenzoyl)propyl]-4-hydroxy-4-(3-trifluoromethylphenyl)piperidine;

8-[γ-(4-Fluorobenzoyl)propyl]-1-phenyl-1,3,8-triazaspiro[4,5]decan-4-one;

8-[γ-(2,4-Difluorobenzoyl)propyl]-1-phenyl-1,3,8-triazaspiro[4,5]decan-4-one;

8-[γ-(2-Dimethylamino-4-fluorobenzoyl)propyl]-1-phenyl-1,3,8-triazaspiro[4,5]decan-4-one;

8-[γ-(2-Ethylamino-4-fluorobenzoyl)propyl]-1-phenyl-1,3,8-triazaspiro[4,5]decan-4-one;

8-[γ-(2-Amino-4-fluorobenzoyl)propyl]-1-phenyl-1,3,8-triazaspiro[4,5]decan-4-one;

8-[γ-(2-Acetamino-4-fluorobenzoyl)propyl]-1-phenyl-1,3,8-triazaspiro[4,5]decan-4-one;

1-[γ-(4-Fluorobenzoyl)propyl]-4-(2-keto-1-benzimidazolynyl)piperidine;

1-[γ-(2,4-Difluorobenzoyl)propyl]-4-(2-keto-1-benzimidazolynyl)piperidine;

1-[γ-(2-Amino-4-fluorobenzoyl)propyl]-4-(2-keto-1-benzimidazolynyl)piperidine;

1-[γ-(2-Acetamino-4-fluorobenzoyl)propyl]-4-(2-keto-1-benzimidazolynyl)piperidine;

1-[γ-(2,4-Difluorobenzoyl)propyl]-4-(2-keto-1-benzimidazolynyl)-1,2,3,6-tetrahydropyridine;

1-[γ-(4-Fluorobenzoyl)propyl]-4-(2-keto-1-benzimidazolynyl)-1,2,3,6-tetrahydropyridine;

1-[γ-(4-Fluorobenzoyl)propyl]-4-(2-methoxyphenyl)-piperazine;

1-[γ-(2-Amino-4-fluorobenzoyl)propyl]-4-(2-methoxyphenyl)piperazine;

1-[γ-(2,4-Difluorobenzoyl)propyl]-4-(2-methoxyphenyl)piperazine;

1-[γ-(4-Fluorobenzoyl)propyl]-phenylpiperazine;

1-[γ-(4-Fluorobenzoyl)propyl]-4-benzyl-4-hydroxypiperidine;

1-[γ-(4-Fluorobenzoyl)propyl]-4-hydroxy-4-(4-tolyl)piperidine;

2-[γ-(2-Amino-4-fluorobenzoyl)propyl]-1,2,3,4-tetrahydroisoquinoline;

2-[γ-(2,4-Difluorobenzoyl)propyl]-1,2,3,4-tetrahydroisoquinoline;

2-[γ-(4-Fluorobenzoyl)propyl]-1,2,3,4-tetrahydroisoquinoline;

1-[γ-(4-Dimethylamino-2-fluorobenzoyl)propyl]-4-hydroxy-4-(3-trifluoromethylphenyl)piperidine;

1-[γ-(4-Ethylamino-2-fluorobenzoyl)propyl]-4-hydroxy-4-(3-trifluoromethylphenyl)piperidine;

1-[γ-(4-Benzylamino-2-fluorobenzoyl)propyl]-4-hydroxy-4-(3-trifluoromethylphenyl)piperidine;

1-[γ-(4-Amino-2-fluorobenzoyl)propyl]-4-hydroxy-4-(3-trifluoromethylphenyl)piperidine;

1-[γ-(4-Fluorobenzoyl)propyl]-4-(4-chloro-3-trifluoromethylphenyl)-4-hydroxypiperidine;

1-[γ-(2,4-Difluorobenzoyl)propyl]-4-(4-chloro-3-trifluoromethylphenyl)-4-hydroxypiperidine;

1-[γ-(2-Amino-4-fluorobenzoyl)propyl]-4-(4-chloro-3-trifluoromethylphenyl)-4-hydroxypiperidine;

1-[γ-(2,4-Difluorobenzoyl)propyl]-4-benzyl-4-hydroxypiperidine;

1-[γ-(4-Fluorobenzoyl)propyl]-4-(4-chlorobenzyl)-4-hydroxypiperidine;

1-[γ-(2,4-Difluorobenzoyl)propyl]-4-(4-chlorobenzyl)-4-hydroxypiperidine;

8-[γ-(2-Dimethylamino-4-fluorobenzoyl)propyl]-1-phenyl-1,3,8-triazaspiro[4,5]decan-4-one;

1-[γ-(2-Dimethylamino-4-fluorobenzoyl)propyl]-4-(2-methoxyphenyl)piperazine;

1-[γ-(2,4-Difluorobenzoyl)propyl]-4-phenylpiperazine;

1-[γ-(4-Fluorobenzoyl)propyl]-4-benzylpiperazine;

1-[γ-(4-Fluorobenzoyl)propyl]-4-hydroxy-4-(4-methoxyphenyl)piperidine;

1-[γ-(4-Fluorobenzoyl)propyl]-4-phenylpiperidine;

1-(γ-Benzoylpropyl)-4-hydroxy-4-(3-trifluoromethylphenyl)piperidine;

8-(γ-Benzoylpropyl)-1-phenyl-1,3,8-triazaspiro[4,5]-decane, etc.

These phenylketone derivatives [I] can be converted into their pharmaceutically acceptable acid addition salts or quaternary ammonium salts by treatment with mineral acids (e.g. hydrochloric acid, hydrobromic acid, sulfuric acid, nitric acid), organic acids (e.g. acetic acid, citric acid, oxalic acid, lactic acid, succinic acid, tartaric acid, cinnamic acid, ascorbic acid), alkyl halides (e.g. methyl chloride, ethyl chloride, methyl bromide, methyl iodide), alkyl tosylate (e.g. methyl tosylate, ethyl tosylate), alkyl sulfate (e.g. methyl sulfate, ethyl sulfate, dimethyl sulfate) or the like.

The pharmacological evaluation in animal tests has demonstrated that the phenylketone derivatives [I] have a variety of depressing activities on the central or autonomic nervous system. They exhibit benificial pharmaceutical properties as medicines such as neuroleptic, tranquilizing, anticonvulsive, analgesic, antiinflammatory or antihypertensive agents. Some of them are more effective on an antiapomorphine test or a conditioned avoidance response test in rats than chlorpromazine and haloperidol, which are well known neuroleptics.

Each of these phenylketone derivatives [I] may be brought into a form suitable for administration according to a method known per se. For the preparation of pharmaceutical compositions, they may be mixed with carriers, diluents, lubricants, fillers and/or binders such as lactose, sucrose, calcium phosphate, starch, talcum, casein, magnesium stearate, methyl cellulose, polyglycols, tragacanth and the like, sometimes together with stabilizers and emulsifying agents. The resulting mixture may be processed in usual manners to tablets, capsules, pills, ampoules and the like.

Practical and presently preferred embodiments of the present invention are illustratively shown in the following Examples, which are not intended to limit the scope of the invention thereto.

EXAMPLE 1

To a mixture of 1.6 g of 1-[γ-(2,4-difluorobenzoyl)-propyl]-4-(4-chlorophenyl)-4-hydroxypiperidine hydrochloride and 120 ml of ethanol was added dropwise a solution of 1.2 g of hydrazine hydrate in 30 ml of ethanol at room temperature. The mixture was refluxed for 1.5 hours with stirring and poured into ice-water under stirring. The precipitated crystals were separated by filtration and recrystallized from aqueous ethanol to yield the hydrazone of 1-[γ-(2,4-difluorobenzoyl)propyl]-4-(4-chlorophenyl)-4-hydroxypiperidine. M.P. 172.5° – 174.5°C.

EXAMPLE 2

To a suspension of 4 g of 1-[γ-(4-fluorobenzoyl)propyl]-4-(4-chlorophenyl)-4-hydroxypiperidine in 50 ml of ethanol was added dropwise a solution of 4 g of hydrazine hydrate in 10 ml of ethanol with stirring. The mixture was heated while refluxing for about 5 hours, allowed to stand at room temperature and then poured into ice-water. The precipitate was collected by filtration and recrystallized from ethanol to give the hydrazone of 1-[γ-(4-fluorobenzoyl)propyl]-4-(4-chlorophenyl)-4-hydroxypiperidine. M.P. 155° – 158°C.

EXAMPLE 3

To a stirred mixture of 3 g of 1-[γ-(4-fluorobenzoyl)propyl]-4-(4-chlorophenyl)-4-hydroxypiperidine, 2.1 g of hydroxylamine hydrochloride, 15 ml of water and 45 ml of ethanol were added 5 g of sodium carbonate. This mixture was heated and refluxed for 5 hours. After cooling, the reaction mixture was slowly poured into ice-water. The precipitated crystals were collected by filtration and recrystallized from aqueous ethanol to give the oxime of 1-[γ-(4-fluorobenzoyl)propyl]-4-(4-chlorophenyl)-4-hydroxypiperidine. M.P. 135° – 137°C.

EXAMPLE 4

A mixture of 4 g of 1-[γ-(4-fluorobenzoyl)propyl]-4-hydroxy-4-(3-trifluoromethylphenyl)piperidine, 4 g of hydrazine hydrate and 60 ml of ethanaol was refluxed for 12 hours. After cooling, the reaction mixture was poured into water. The precipitated crystals were collected by filtration and recrystallized from ethanol to give the hydrazone of 1-[γ-(4-fluorobenzoyl)propyl]-4-hydroxy-4-(3-trifluoromethylphenyl)piperidine. M.P. 128° – 131°C.

EXAMPLE 5

A mixture of 3.6 g of 1-[γ-(4-fluorobenzoyl)propyl]-4-(4-chlorophenyl)-4-hydroxypiperidine, 1.7 g of 3-fluorophenylhydrazine and 60 ml of acetic acid was stirred at room temperature for 2.5 hours. The resulting mixture was poured into water, made alkaline and extracted with ethyl acetate. The extract was washed with saturated aqueous sodium chloride solution, dried over sodium sulfate and concentrated under reduced pressure. The residual solid was recrystallized from ethanol to give the 3-fluorophenylhydrazone of 1-[γ-(4-fluorobenzoyl)propyl]-4-(4-chlorophenyl)-4-hydroxypiperidine. M.P. 174.5 – 175.5°C.

EXAMPLE 6

A mixture of 3.1 g of 1-[γ-(4-fluorobenzoyl)propyl]-4-(4-chlorophenyl)-4-hydroxypiperidine, 1.9 g of 4-chlorophenylhydrazine and 40 ml of acetic acid was stirred at room temperature for 7.5 hours. The resulting mixture was poured into ice-water and made alkaline under stirring. The precipitate was collected by filtration and recrystallized from ethanol to give the 4-chlorophenylhydrazone of 1-[γ-(4-fluorobenzoyl)propyl]-4-(4-chlorophenyl)-4-hydroxypiperidine. M.P. 188° – 190°C.

EXAMPLE 7

A mixture of 5.0 g of 1-[γ-(2-amino-4-fluorobenzoyl)propyl]-4-hydroxy-4-(3-trifluoromethylphenyl)piperidine, 5.0 g of hydrazine hydrate and 60 ml of ethanol was refluxed for 28 hours. The reaction mixture was poured into cold water. The precipitate was collected by filtration, washed with water and recrystallized from aqueous ethanol to give the hydrazone of 1-[γ-(2-amino-4-fluorobenzoyl)propyl]-4-hydroxy-4-(3-trifluoromethylphenyl)piperidine, M.P. 141° – 143°C.

EXAMPLE 8

A mixture of 2.0 g of 1-[γ-(4-fluorobenzoyl)propyl]-4-hydroxy-4-(3-trifluoromethylphenyl)piperidine, 2.1 g of hydroxylamine hydrochloride, 5.0 g of sodium carbonate, 15 ml of water and 45 ml of ethanol was heated for 7.5 hours under refluxing. The resulting mixture was poured into ice-water and extracted with ethyl acetate. The extract was washed with saturated aqueous sodium chloride solution, dried over anhydrous sodium sulfate and evaporated under reduced pressure. The residual solid was recrystallized from diisopropyl ether to yield the oxime of 1-[γ-(4-fluorobenzoyl)propyl]-4-hydroxy-4-(3-trifluoromethylphenyl)piperidine. M.P. 160° – 161°C.

EXAMPLE 9

A mixture of 1.0 g of 1-[γ-(4-fluorobenzoyl)propyl]-4-hydroxy-4-(3-trifluoromethylphenyl)piperidine, 0.2 g of zinc chloride, 1.0 g of N,N-dimethylhydrazine and 30 ml of ethanol was stirred at 40° – 50°C for 30 hours. The mixture was poured into ice-water, made alkaline by addition of aqueous ammonium hydroxide solution and extracted with ethyl acetate. The extract was washed with water, dried over anhydrous sodium sulfate and evaporated under reduced pressure. The residual solid was recrystallized from aqueous ethanol to yield the N,N-dimethylhydrazone of 1-[γ-(4-fluorobenzoyl)propyl]-4-hydroxy-4-(3-trifluoromethylphenyl)piperidine. M.P. 127°C.

What is claimed is:

1. A compound of the formula:

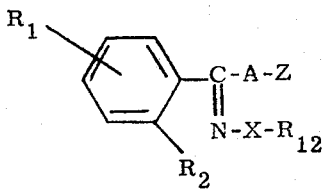

wherein $R_1$ is a hydrogen atom, a halogen atom, a lower alkyl group, a lower alkoxy group, an amino group, a lower alkylamino group, a di(lower)alkylamino group, a benzylamino group or a trifluoromethyl group, $R_2$ is a hydrogen atom, a halogen atom, an amino group, an acylamino group selected from the group consisting of a $C_1$–$C_5$ alkanoylamino group, a benzoylamino group and a $C_1$–$C_5$ alkanoylamino group or benzoylamino group substituted with a substituent selected from the group consisting of hydrogen, halogen, hydroxyl, lower alkyl, lower alkoxy nitro, and trifluoromethyl, and N-lower alkyl-N-acylamino group, of which the acylamino moiety is the acylamino group heretofore defined, a lower alkylamino group, a di(lower)alkylamino group or a nitro group, $R_{12}$ is a hydrogen atom, a lower alkyl group, a carbamoyl group or an aromatic group selected from the group consisting of phenyl, halophenyl, tolyl, and methoxyphenyl, A is a lower alkylene group, X is an oxygen atom or

wherein $R_{13}$ is a hydrogen atom, a lower alkyl group or an aromatic group selected from the group consisting of phenyl, halophenyl, tolyl, and methoxyphenyl and Z is a group of either one of the formulas:

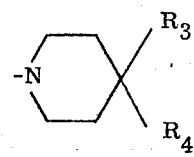

wherein $R_3$ is a hydrogen atom or a hydroxyl group and $R_4$ is a hydrogen atom, a phenyl group a benzyl group, a phenyl group substituted with one or more substituents selected from the group consisting of halogen, lower alkyl, lower alkoxy and trifluoromethyl on the benzene ring, and a benzyl group having one or more substituents selected from the group consisting of halogen, lower alkyl, lower alkoxy and trifluoromethyl on the benzene ring.

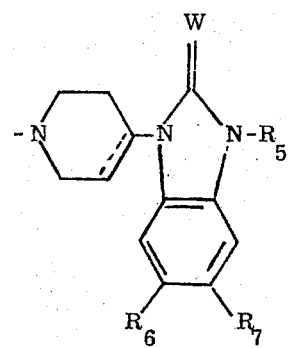

wherein W is two hydrogen atoms or an oxygen atom, $R_5$ is a hydrogen atom or a lower alkyl group, $R_6$ and $R_7$ are each a hydrogen atom, a halogen atom or a lower alkyl group and the dotted line is an optional bond between the carbon atoms at the 3- and 4- positions of the piperidine ring,

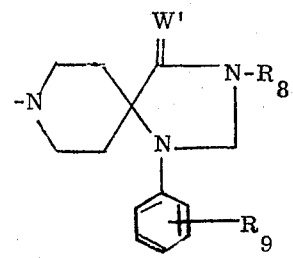

wherein W' is two hydrogen atoms or an oxygen atom, $R_8$ is a hydrogen atom or a lower alkyl group and $R_9$ is a hydrogen atom, a halogen atom, a lower alkyl group or a lower alkoxy group,

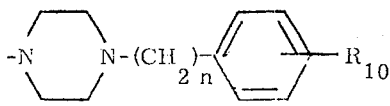

wherein $R_{10}$ is a hydrogen atom, a halogen atom, a lower alkyl group, a lower alkoxy group or a trifluoromethyl group and n is an integer of from 0 to 2, and

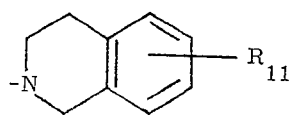

wherein $R_{11}$ is a hydrogen atoms, a halogen atom, a hydroxyl group, a lower alkyl group, a lower alkoxy group or a nitro group, and its pharmaceutically acceptable acid addition salts and quaternary ammonium salts.

2. The compound according to claim 1, wherein X is

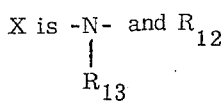

and $R_{12}$ is a hydrogen atom, a lower alkyl group or an aromatic group selected from the group consisting of phenyl, halophenyl, tolyl, and methoxyphenyl.

3. The compound according to claim 1, wherein $R_1$ is a halogen atom.

4. The compound according to claim 1, wherein A is trimethylene.

5. A compound of the formula:

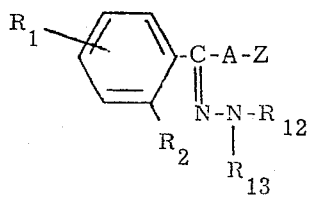

wherein $R_1$ is a hydrogen atom, a halogen atom, a lower alkyl group, a lower alkoxy group, an amino group, a lower alkylamino group, a di(lower)alkylamino group, a benzylamino group or a trifluoromethyl group, $R_2$ is a hydrogen atom, a halogen atom, an amino group, an acylamino group selected from the group consisting of a $C_1$-$C_5$ alkanoylamino group, a benzoylamino group and a $C_1$-$C_5$ alkanoylamino group or benzoylamino group substituted with a substituent selected from the group consisting of hydrogen, halogen, hydroxyl, lower alkyl, lower alkoxy nitro, and trifluoromethyl, an N-lower alkyl-N-acylamino group, of which the acylamino moiety is the acylamino group heretofore defined, a lower alkylamino group, a di(-lower)alkylamino group or a nitro group, $R_{12}$ is a hydrogen atom, a lower alkyl group, a carbamoyl group or an aromatic group selected from the group consisting of phenyl, halophenyl, tolyl, and methoxyphenyl, $R_{13}$ is a hydrogen atom, a lower alkyl group of an aromatic group selected from the group consisting of phenyl, halophenyl, tolyl, and methoxyphenyl, A is a lower alkylene group and Z is a group of either one of the formulas:

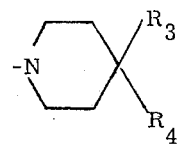

wherein $R_3$ is a hydrogen atom or a hydroxyl group and $R_4$ is a hydrogen atom, a phenyl group, a benzyl group, a phenyl group substituted with one or more substituents selected from the group consisting of halogen, lower alkyl, lower alkoxy and trifluoromethyl on the benzene ring, and a benzyl group having one or more substituents selected from the group consisting of halogen, lower alkyl, lower alkoxy and trifluoromethyl on the benzene ring,

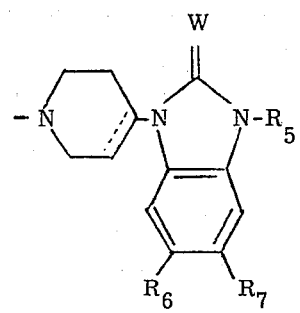

wherein W is two hydrogen atoms or an oxygen atom, $R_5$ is a hydrogen atom or a lower alkyl group, $R_6$ and $R_7$ are each a hydrogen atom, a halogen atom or a lower alkyl group and the dotted line is an optional bond between the carbon atoms at the 3- and 4-positions of the piperidine ring,

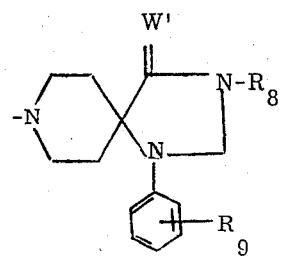

wherein W' is two hydrogen atoms or an oxygen atom, $R_8$ is a hydrogen atom or a lower alkyl group and $R_9$ is a hydrogen atom, a halogen atom, a lower alkyl group or a lower alkoxy group,

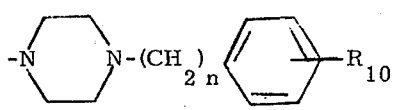

wherein $R_{10}$ is a hydrogen atom, a halogen atom, a lower alkyl group, a lower alkoxy group or a trifluoromethyl group and n is an integer of from 0 to 2, and

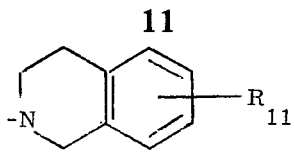

wherein $R_{11}$ is a hydrogen atom, a halogen atom, a hydroxyl group, a lower alkyl group, a lower alkoxy group or a nitro group, and its pharmaceutically acceptable acid addition salts and quaternary ammonium salts.

6. A compound of the formula:

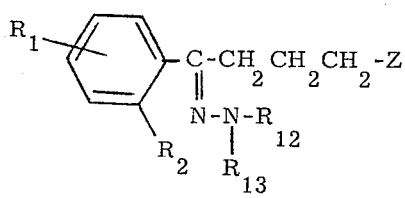

wherein $R_1$ is a hydrogen atom, a halogen atom, a lower alkyl group, a lower alkoxy group, an amine group, a lower alkylamino group, a di(lower)alkylamino group, 2 benzylamino group or a trifluoromethyl group, $R_2$ is a hydrogen atom, a halogen atom, an amino group, an acylamino group selected from the group consisting of a $C_1$-$C_5$ alkanoylamino group, a benzoylamino group and a $C_1$-$C_5$ alkanoylamino group or benzoylamino group substituted with a substituent selected from the group consisting of hydrogen, halogen hydroxyl, lower alkyl lower alkoxy nitro, and trifluoromethyl, an N-lower alkyl-N-acylamino group, of which the acylamino moiety is the acylamino group heretofore defined, a lower alkylamino group, a di(-lower)alkylamino group or a nitro group, $R_{12}$ is a hydrogen atom, a lower alkyl group, a carbomoyl group or an aromatic group selected from the group consisting of phenyl, halophenyl, tolyl, and methoxyphenyl $R_{13}$ is a hydrogen atom, a lower alkyl group or an aromatic group selected from the group consisting of phenyl, halophenyl, tolyl, and methoxyphenyl, and Z is a group of either one of the formulas:

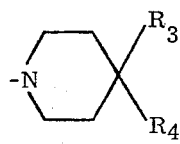

wherein $R_3$ is a hydrogen atom or a hydroxyl group and $R_4$ is a hydrogen atom, a phenyl group, a benzyl group, a phenyl group substituted with one or more substituents selected from the group consisting of halogen, lower alkyl, lower alkoxy and trifluoromethyl on the benzene ring, and a benzyl group having one or more substituents selected from the group consisting of halogen, lower alkyl, lower alkoxy and trifluoromethyl on the benzene ring,

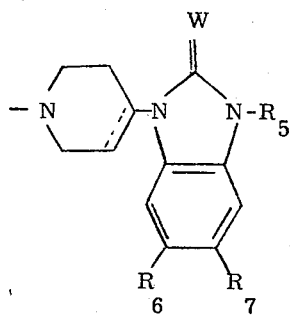

wherein W is two hydrogen atoms or an oxygen atom, $R_5$ is a hydrogen atom or a lower alkyl group, $R_6$ and $R_7$ are each a hydrogen atom, a halogen atom or a lower alkyl group and the dotted line is an optional bond between the carbon atoms at the 3- and 4- positions of the piperidine ring,

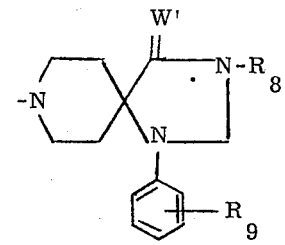

wherein W' is two hydrogen atoms or an oxygen atom, $R_8$ is a hydrogen atom or a lower alkyl group and $R_9$ is a hydrogen atom, a halogen atom, a lower alkyl group or a lower alkoxy group,

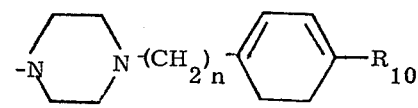

wherein $R_{10}$ is a hydrogen atom, a halogen atom, a lower alkyl group, a lower alkoxy group or a trifluoromethyl group and n is an integer of from 0 to 2, and

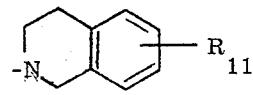

wherein $R_{11}$ is a hydrogen atom, a halogen atom, a hydroxyl group, a lower alkyl group, a lower alkoxy group or a nitro group, and its pharmaceutically acceptable acid addition salts and quaternary ammonium salts.

7. A compound of the formula:

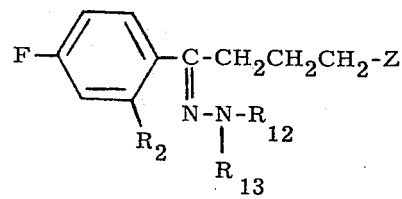

wherein $R_2$ is a hydrogen atom, a halogen atom, an amino group, an acylamino group selected from the group consisting of a $C_1$-$C_5$ alkanoylamino group, a benzoylamino group and a $C_1$-$C_5$ alkanoylamino group or benzoylamino group substituted with a substituent selected from the group consisting of hydrogen, halogen, hydroxyl, lower alkyl, lower alkoxy nitro, and trifluoromethyl, an N-lower alkyl-N-acylamino group, of which the acylamino moiety is the acylamino group heretofore defined, a lower alkylamino group, a di(-lower)alkylamino group or a nitro group, $R_{12}$ is a hydrogen atom, a lower alkyl group, a carbamoyl group or an aromatic group selected from the group consisting of phenyl, halophenyl, tolyl, and methoxyphenyl, $R_{13}$ is a hydrogen atom, a lower alkyl group or an aromatic group selected from the group consisting of phenyl, halophenyl, tolyl, and methoxyphenyl, and Z is a group of either one of the formulas:

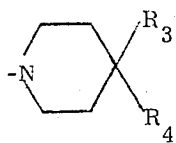

wherein $R_3$ is a hydrogen atom or a hydroxyl group and $R_4$ is a hydrogen atom, a phenyl group, a benzyl group, a phenyl group substituted with one or more substitutents selected from the group consisting of halogen, lower alkyl, lower alkoxy and trifluoromethyl on the benzene ring, and a benzyl group having one or more substitutents selected from the group consisting of halogen, lower alkyl, lower alkoxy and trifluoromethyl on the benzene ring.

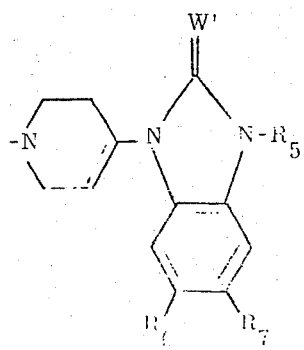

wherein W is two hydrogen atoms or an oxygen atom, $R_5$ is a hydrogen atom or a lower alkyl group, $R_6$ and $R_7$ are each a hydrogen atom, a halogen atom or a lower alkyl group and the dotted line is an optional bond between the carbon atoms at the 3- and 4- positions of the piperidine ring,

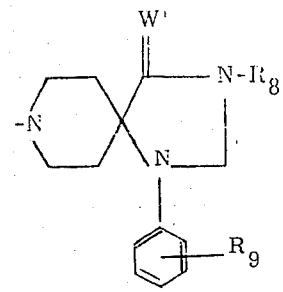

wherein $W'$ is two hydrogen atoms or an oxygen atom, $R_8$ is a hydrogen atom or a lower alkyl group and $R_9$ is a hydrogen atom, a halogen atom, a lower alkyl group or a lower alkoxy group,

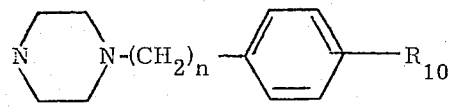

wherein $R_{10}$ is a hydrogen atom, a halogen atom, a lower alkyl group, a lower alkoxy group or a trifluoromethyl group and $n$ is an integer of from 0 to 2, and

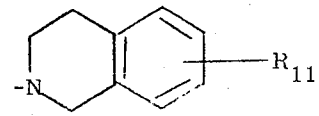

wherein $R_{11}$ is a hydrogen atom, a halogen atom, a hydroxyl group, a lower alkyl group, a lower alkoxy group or a nitro group, and its pharmaceutically acceptable acid addition salts and quaternary ammonium salts.

* * * * *